United States Patent
Leone

(10) Patent No.: US 9,470,183 B2
(45) Date of Patent: Oct. 18, 2016

(54) COORDINATION OF SECONDARY AIR AND BLOW-THROUGH AIR DELIVERY

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 14/458,198

(22) Filed: Aug. 12, 2014

(65) Prior Publication Data

US 2016/0047337 A1    Feb. 18, 2016

(51) Int. Cl.

| | |
|---|---|
| *F02D 13/02* | (2006.01) |
| *F02B 33/04* | (2006.01) |
| *F02M 25/07* | (2006.01) |
| *F01L 1/34* | (2006.01) |
| *F02D 41/10* | (2006.01) |
| *F02D 41/14* | (2006.01) |
| *F02D 41/18* | (2006.01) |

(Continued)

(52) U.S. Cl.
CPC .............. *F02M 25/0706* (2013.01); *F01L 1/34* (2013.01); *F02B 37/12* (2013.01); *F02D 13/0215* (2013.01); *F02D 13/0261* (2013.01); *F02D 23/02* (2013.01); *F02D 37/02* (2013.01); *F02D 41/0007* (2013.01); *F02D 41/10* (2013.01); *F02D 41/1448* (2013.01); *F02D 41/182* (2013.01); *F02M 25/072* (2013.01); *F02P 5/045* (2013.01); *F02P 5/1504* (2013.01); *F02B 37/18* (2013.01); *F02B 2037/122* (2013.01); *F02D 2041/001* (2013.01); *F02D 2200/0406* (2013.01); *F02D 2200/602* (2013.01); *F02D 2250/18* (2013.01); *F02D 2250/22* (2013.01); *F02M 26/05* (2016.02); *Y02T 10/121* (2013.01)

(58) Field of Classification Search
CPC ...... F02B 37/168; F02B 29/06; F02B 21/00; F02B 33/44; F02M 25/0706; F02M 25/072; F02M 25/0707; F02M 25/0712; F02M 26/05; F02M 26/07; F02M 26/43; F02D 21/06; F02D 26/10; F02D 33/02; F02D 7/02; F02D 2007/025; F02D 13/0215; F02D 13/0261; F02D 13/0203; F02D 13/0207; F02D 23/02; F02D 41/10; F02D 41/1448; F02D 41/007; F02D 41/401; F02D 2200/0406; F02D 2250/34; F02D 2041/001; F02D 2700/0279; F01L 1/34
USPC ............. 123/559.2, 559.1, 564, 585; 60/611, 60/598
See application file for complete search history.

(56) References Cited

U.S. PATENT DOCUMENTS

| | | |
|---|---|---|
| 5,136,842 A | 8/1992 | Achleitner et al. |
| 5,235,956 A | 8/1993 | Yoshizaki |

(Continued)

FOREIGN PATENT DOCUMENTS

EP    1591651 A1    11/2005

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

Methods and systems are provided for controlling and coordinating secondary air injection and blow-through to reduce turbo lag. By utilizing secondary air injection prior to providing blow-through, and deactivating the secondary air pump when a desired boost pressure for blow-through is achieved, turbine spin-up to a desired speed may be expedited and initial torque output may be increased.

20 Claims, 7 Drawing Sheets

(51) Int. Cl.
*F02P 5/04* (2006.01)
*F02P 5/15* (2006.01)
*F02D 37/02* (2006.01)
*F02D 41/00* (2006.01)
*F02D 23/02* (2006.01)
*F02B 37/12* (2006.01)
*F02B 37/18* (2006.01)

(56) References Cited

U.S. PATENT DOCUMENTS

| | | | | |
|---|---|---|---|---|
| 5,529,549 A * | 6/1996 | Moyer | ............... | B60K 6/12 123/198 F |
| 5,544,483 A * | 8/1996 | Heuer | ............... | F01N 3/2033 60/283 |
| 7,975,666 B2 * | 7/2011 | Gokhale | ............... | F02B 21/00 123/179.18 |
| 8,280,610 B2 | 10/2012 | Santoso et al. | | |
| 8,468,800 B2 | 6/2013 | Hatamura | | |
| 8,567,191 B2 * | 10/2013 | Geyer | ............... | F02B 37/10 123/26 |
| 2007/0283939 A1 * | 12/2007 | Berger | ............... | F01L 3/06 123/585 |
| 2010/0170460 A1 * | 7/2010 | Leone | ............... | F02D 13/0249 123/90.16 |
| 2013/0019593 A1 | 1/2013 | Jacques et al. | | |
| 2013/0061579 A1 | 3/2013 | Kotrba et al. | | |
| 2013/0305716 A1 * | 11/2013 | Rollinger | ............... | F02D 41/10 60/605.2 |
| 2015/0204249 A1 * | 7/2015 | Glugla | ............... | F02B 37/168 123/90.15 |
| 2016/0047337 A1 * | 2/2016 | Leone | ............... | F01L 1/34 123/406.12 |

* cited by examiner

COORDINATION OF SECONDARY AIR AND BLOW-THROUGH AIR DELIVERY

TECHNICAL FIELD

The present description relates generally to methods and systems for improving turbo lag and torque output with coordination of secondary air injection and blow-through air in a boosted internal combustion engine.

BACKGROUND AND SUMMARY

A boosted engine may offer greater fuel efficiency and lower emissions than a naturally aspirated engine of similar power. During transient conditions, however, the power, fuel efficiency, and emissions-control performance of a boosted engine may suffer. Such transient conditions may include rapidly increasing or decreasing engine load, engine speed, or mass air flow. For example, when the engine load increases rapidly, a turbocharger compressor may require increased torque to deliver an increased air flow. Such torque may not be available if the turbine that drives the compressor is not fully spun up. As a result, an undesirable power lag may occur before the intake air flow builds to the required level.

It has been recognized previously that a turbocharged engine system may be adapted to provide "blow-through" air wherein boosted intake air is driven from the intake manifold, downstream of the compressor, through the engine cylinder(s) and into the exhaust manifold, upstream of the turbine. For example, a variable cam timing (VCT) system may be temporarily adjusted to provide high valve overlap. During the positive valve overlap, the boosted air is inducted through the cylinders into the turbine to temporarily provide extra mass flow and enthalpy in the exhaust. The extra turbine energy enables the turbine to spin-up faster, thereby reducing turbo lag.

However, the inventors herein have identified potential issues with such an approach. As one example, in order to provide the blow-through, the engine has to be in a positive pumping regime (that is, under boosted engine operation), else turbocharger performance may be degraded. Further, during blow-through, the engine may be operated with high levels of spark retard in order to provide additional energy to the exhaust for increasing turbine speed and boost. However, operating the engine with high levels of spark retard may cause combustion to occur later than an optimal timing required for immediate torque output.

Thus, at least some of the above issues may be addressed by a method for a turbocharged engine comprising: supplying compressed air through a throttle to an engine from a compressor driven by a turbine coupled to an exhaust of the engine; and during tip-in of the throttle, reducing turbo-lag by delivering ambient air to the turbine during a first mode of operation and during a second mode of operation providing blow-through of a portion of the compressed air through the engine, without combustion, to the turbine.

As an example, in response to a tip-in, a secondary air pump may be utilized to deliver secondary air in to an exhaust manifold upstream of a turbine. At the same time, enrichment may be provided to generate high levels of engine out carbon monoxide (CO), hydrogen ($H_2$), and hydrocarbons to react with the secondary air in the exhaust. As a result, mass and enthalpy of the exhaust may be increased, which may be utilized to increase a speed of the turbine to a desired speed. Further, due to increase in turbine speed, a boost pressure may be increased. Upon attaining a threshold boost pressure at which sufficient boost may be available for blow-through, engine operation may switch to providing blow-through. That is, secondary air injection may be stopped and blow-through may be utilized to provide extra air in the exhaust.

In some examples, upon reaching the threshold boost pressure, a secondary air injection amount may be decreased and simultaneously, blow-through air amount may be increased until the secondary air injection amount decreases below a threshold amount, after which engine may be operated with blow-through only until the desired turbine speed is achieved.

By providing secondary air injection early during the tip-in, sufficient boost may be generated, which may be utilized for blow-through. As a result, turbocharger performance may be improved. Further, utilizing secondary air injection during the initial part of the tip-in may allow higher trapped mass in the cylinder (since the extra air in the exhaust required for extra exhaust energy is provided by the secondary air pump instead of the turbocharger). As a result, initial torque output may be improved. Additionally, by utilizing secondary air injection during the early part of tip-in, valve timings may be adjusted to increase initial torque output. Still further, by switching engine operation to additionally or alternatively provide blow-through after sufficient boost is attained, the time required for the turbine to reach a desired speed may be reduced, thereby reducing turbo lag. In this way, secondary air injection and blow-through may be coordinated during tip-in to expedite turbine spin-up and improve initial torque output.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
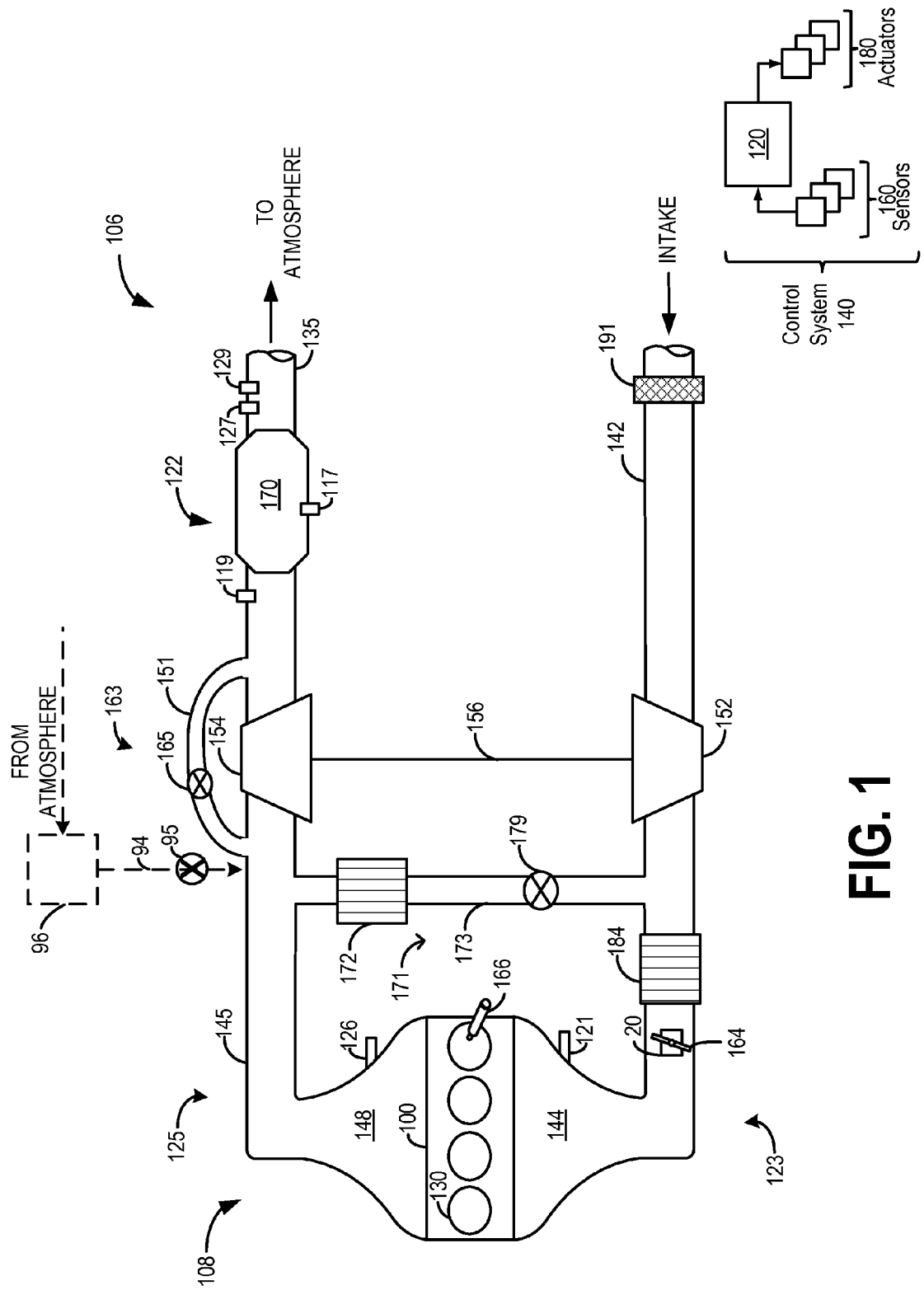
FIG. 1 shows a schematic depiction of an engine system.
Figure 2:
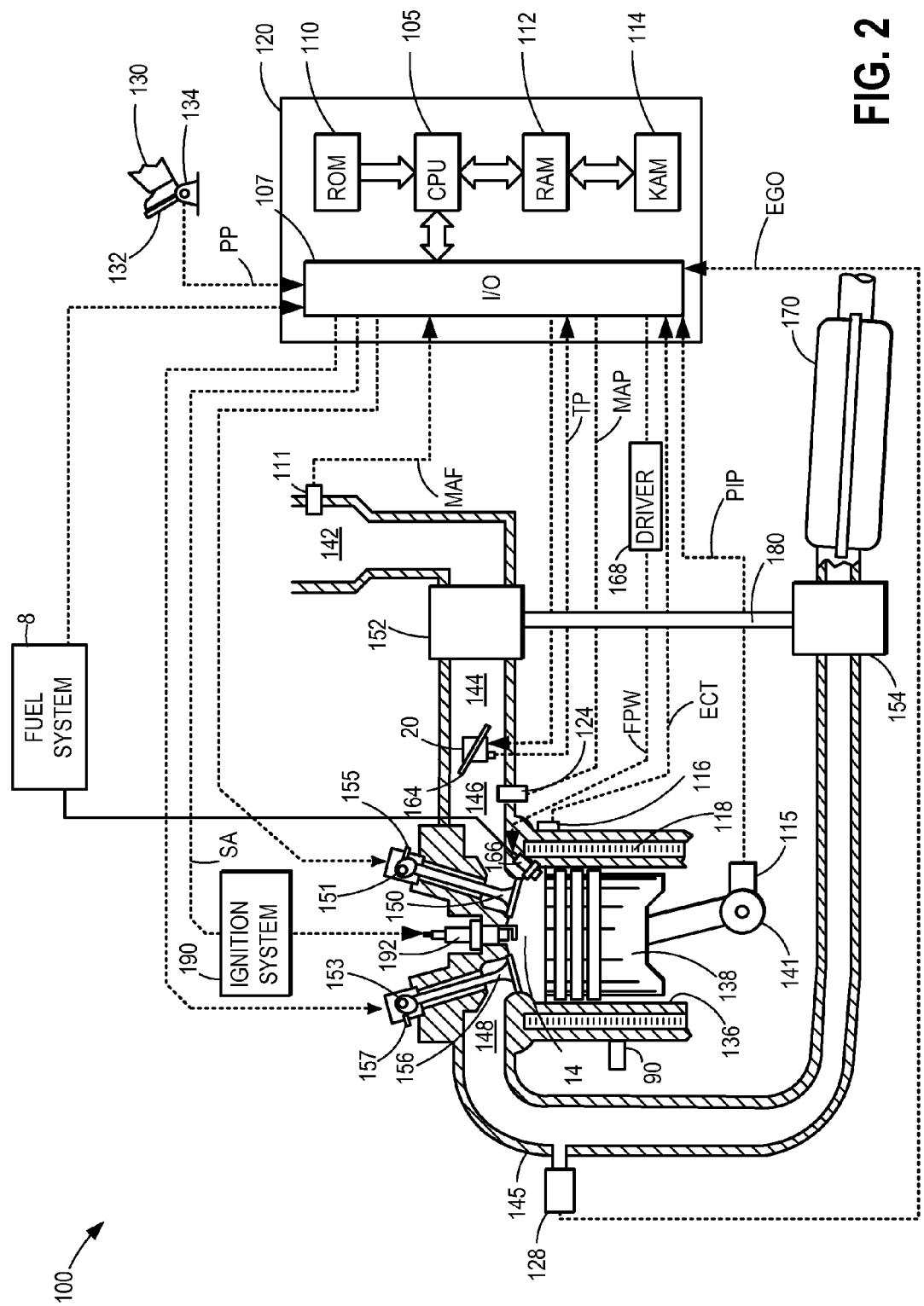
FIG. 2 shows a schematic diagram of one cylinder of the engine system of FIG. 1.

Methods and systems are provided for reducing turbo lag in a vehicle engine, such as the engine system depicted at FIGS. 1-2. During a tip-in, secondary air injection and blow-through may be coordinated to expedite spinning of a turbine to a desired speed, and increase initial torque output. A controller may be configured to perform control routines, such as the example routines of FIGS. 3-6 to determine a type of engine operation that may be performed (e.g., secondary air injection and/or blow-through) during the tip-in, and to adjust the engine operation based on the type of operating mode. Example secondary air injection and blow-through adjustments are described at FIG. 7.

FIG. 1 shows a schematic depiction of a vehicle system 106. The vehicle system 106 includes an engine system 108, including engine 100 coupled to emission control system 122. Engine 100 includes a plurality of cylinders 14. Engine 100 also includes an intake 123 and an exhaust 125. Intake 123 may receive fresh air from the atmosphere through intake passage 142. Air entering intake passage 142 may be filtered by air filter 191. Intake passage 142 may include an air intake throttle 164 positioned downstream of an intake compressor 152 and an intake charge air cooler 184. Intake throttle 164 may be configured to adjust the flow of intake gas (e.g., boosted intake air) entering engine intake manifold 146. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 161. Turbocharger 161 may include intake compressor 152, arranged along intake passage 142, and an exhaust turbine 154, arranged along exhaust passage 145. Compressor 152 may be at least partially driven by turbine 154 via shaft 180. The amount of boost provided by the turbocharger may be varied by an engine controller. Turbine bypass passage 163 controlled via wastegate 165 may be coupled across the exhaust turbine so that some or all of the exhaust gases flowing through exhaust passage 145 can bypass turbine 154. By adjusting the position of the wastegate, an amount of exhaust gas delivered through the turbine may be varied, thereby varying an amount of boost delivered to the engine intake.

In further embodiments, a similar bypass passage controlled via a bypass valve (not shown) may be coupled across the intake compressor so that some or all of the intake air compressed by compressor 152 can be recirculated into the intake passage 142 upstream of compressor 152. By adjusting the position of the compressor bypass valve, pressure in the intake system may be released during selected conditions to reduce the effects of compressor surge loading.

An optional charge air cooler 184 may be included downstream of compressor 152 in the intake passage to reduce the temperature of intake air compressed by the turbocharger. Specifically, after-cooler 184 may be included upstream of intake throttle 164 or integrated into the intake manifold 144.

Emission control system 122, coupled to exhaust passage 145, includes an emission control device 178. Emission control device 178 may include multiple catalyst bricks, in one example. In another example, multiple emission control devices, each with multiple bricks, can be used. Emission control device 178 can be a three-way type catalyst in one example. In other examples, emission control device 178 may be an oxidation catalyst, lean NOx trap, selective catalyst reduction (SCR) device, particulate filter, or other exhaust treatment device. While emission control device 178 is arranged downstream of turbine 154 in the embodiments described herein, in other embodiments, emission control device 178 may be arranged upstream of a turbocharger turbine or at another location in the engine exhaust passage without departing from the scope of this disclosure.

In some examples, vehicle system 106 may further include a low-pressure EGR (LP-EGR) system (not shown). The LP-EGR system may include a LP-EGR passage that couples exhaust passage 145, downstream of exhaust emission control device 178 with air intake passage 142, upstream of compressor 152. An EGR cooler (not shown) and a LP-EGR valve (not shown) may be arranged in LP-EGR passage to cool the exhaust gas flowing there-through and to vary an amount and/or rate of exhaust gas recirculated from the exhaust passage to the intake passage via the LP-EGR system respectively.

In some examples (as depicted), vehicle system 106 may further include a high-pressure EGR (HP-EGR) system 171. HP-EGR system 171 includes an EGR passage 173 that couples exhaust passage 145, upstream of turbine 154 with air intake passage 142, downstream of compressor 152 and upstream of charge air cooler 184 and intake throttle 164. An EGR cooler 172 arranged in EGR passage 173 cools exhaust gas flowing there-through. A position of EGR valve 179, located in EGR passage 173 on the intake passage side of EGR cooler 172, may be adjusted by controller 120 to vary an amount and/or rate of exhaust gas recirculated from the exhaust passage to the intake passage via the HP-EGR system. In some embodiments, one or more sensors may be positioned within HP-EGR passage 173 to provide an indication of one or more of a pressure, temperature, and air-fuel ratio of exhaust gas recirculated through the HP-EGR passage.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 181. As one example, sensors 160 may include exhaust gas oxygen sensor 126 coupled to exhaust manifold 148, MAP sensor 121 coupled to intake manifold 144, exhaust catalyst temperature sensor 117, exhaust pressure sensor 119 located upstream of emission control device 178 in tailpipe 135, exhaust temperature sensor 127 and exhaust pressure sensor 129 located downstream of emission control device 178 in tailpipe 135. Various exhaust gas sensors may also be included in exhaust passage 145 downstream of emission control device 178, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 181 may include fuel injector 166, EGR valve 159, and intake throttle 164. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. Example control routines are described herein with regard to FIGS. 3-6.

Figure 3:
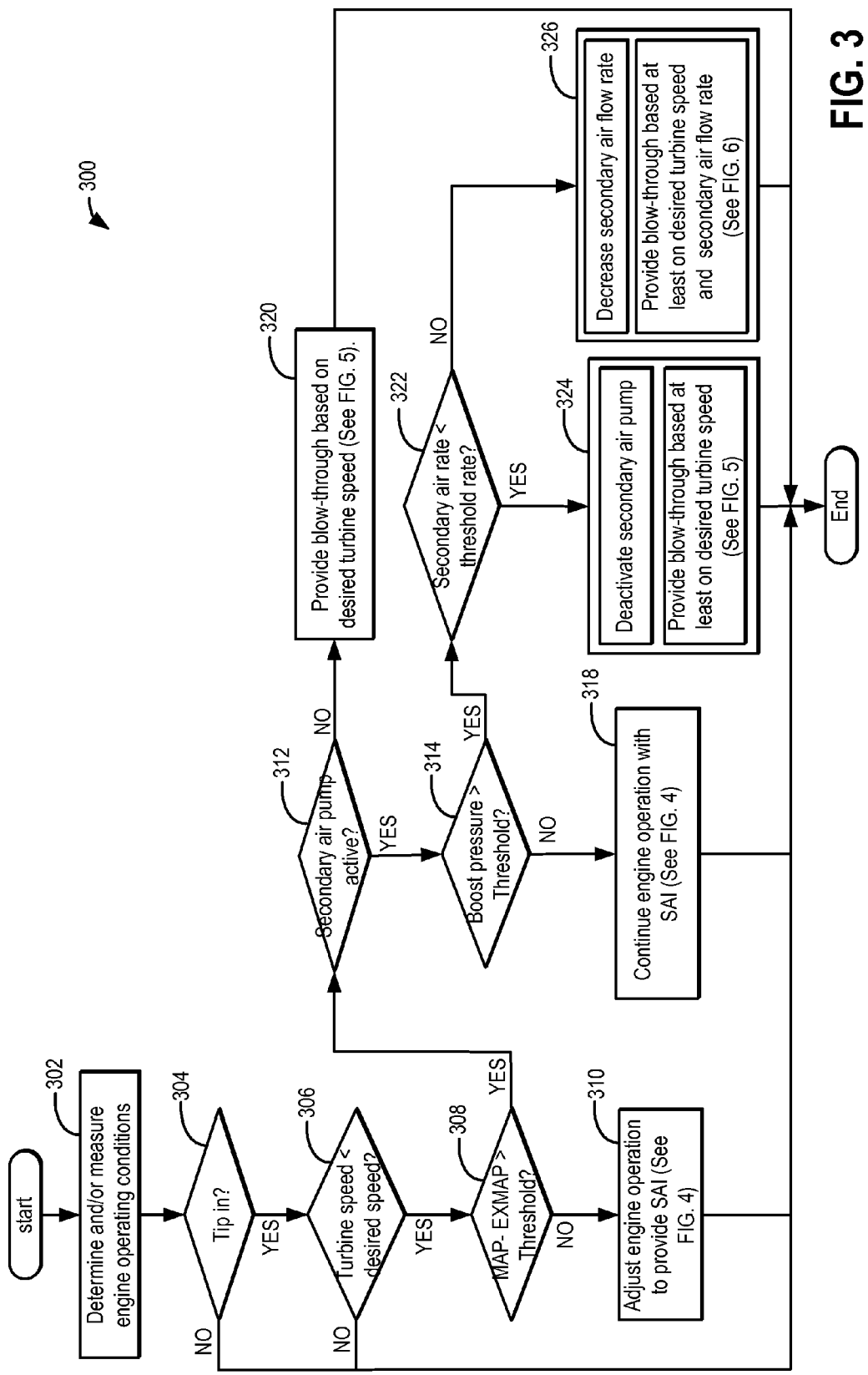
FIG. 3 shows a high level flow chart illustrating a routine that may be implemented for coordinating secondary air injection and blow-through during a tip-in so as to reduce turbo lag.
Figure 4:
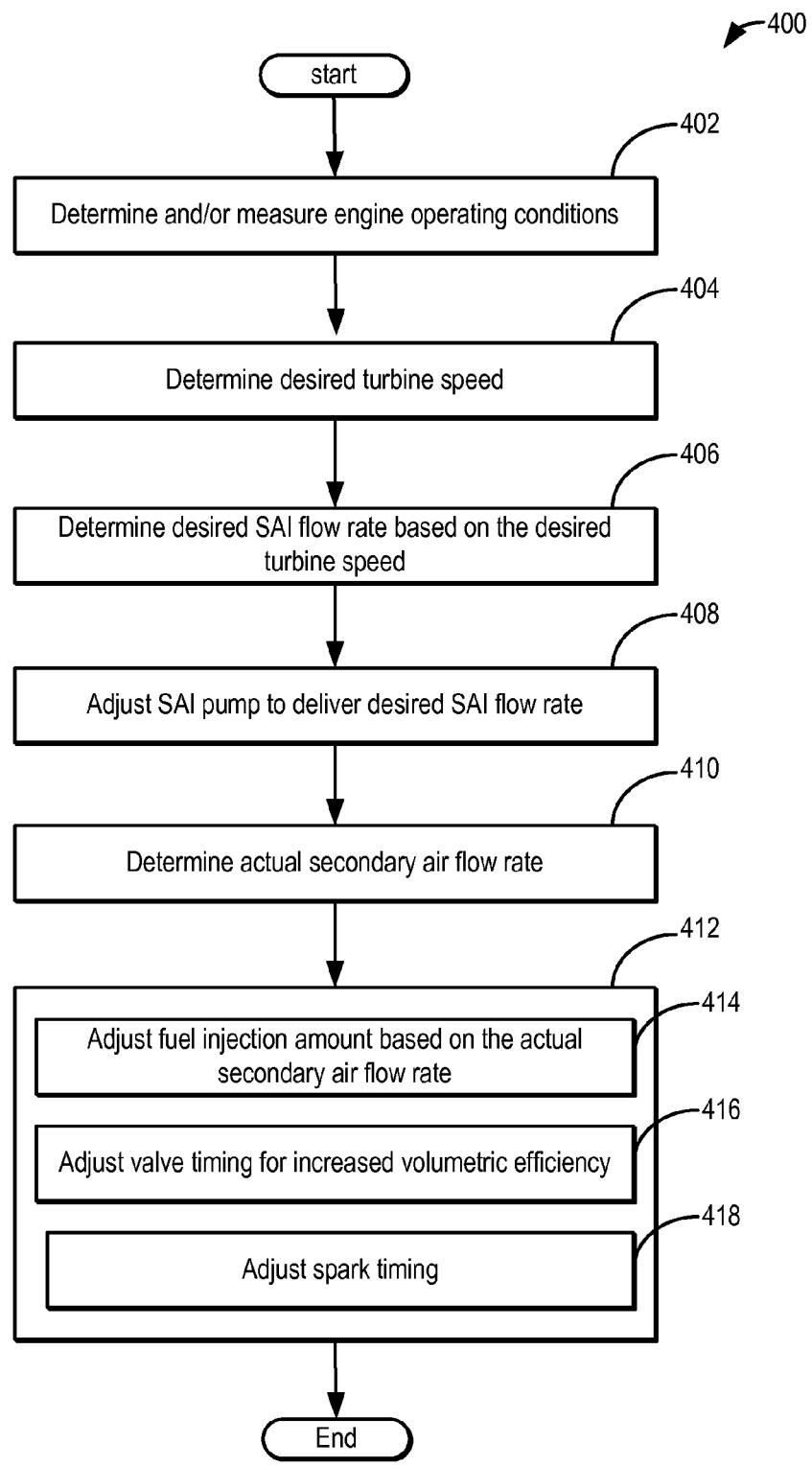
FIG. 4 shows a high level flow chart illustrating a routine that may be implemented for providing secondary air injection, to be used in conjunction with FIG. 3.

As further elaborated herein with reference to FIGS. 3, and 4 controller 120 may be configured to inject secondary air flow into the exhaust passage upstream of the turbine to increase the exhaust energy during selected engine operating conditions (e.g. during an early part of a tip-in). An air pump 96 may be present to inject outside air (e.g., from the atmosphere) into the exhaust manifold 148 via injection line 94, which is controlled by valve 95. As such, air pump 96 utilized to reduce turbo lag as discussed herein may be designed with a higher flow rate with respect to an air pump that may be utilized for cold start. In one example, air pump 96 may deliver outside air into the exhaust passage 135 at a location downstream of the turbine and upstream of the catalyst. Further, as elaborated herein with reference to FIGS. 3 and 5, controller 120 may be configured to adjust the VCT system to a timing that provides high positive valve overlap in order to deliver blow-through air to the exhaust manifold upstream of the turbine during selected engine operations (e.g. during a later part of the tip-in). In some examples, as elaborated herein with reference to FIGS. 3 and 6, controller 120 may simultaneously adjust secondary air injection and blow-through during select engine operations (e.g. during an intermediate part of tip-in between the early part and the late part). In this way, as elaborated herein with reference to FIGS. 3-6, the controller may be configured to coordinate secondary air injection and VCT timing for blow-through in order to reduce turbo lag and increase initial torque output.

FIG. 2 depicts an example embodiment of a combustion chamber or cylinder of internal combustion engine 100. Engine 100 may receive control parameters from a control system including controller 120 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 100 may include combustion chamber walls 136 with piston 138 positioned therein. Piston 138 may be coupled to crankshaft 141 so that reciprocating motion of the piston is translated into rotational motion of the crankshaft. Crankshaft 141 may be coupled to at least one drive wheel of the passenger vehicle via a transmission system. Further, a starter motor may be coupled to crankshaft 141 via a flywheel to enable a starting operation of engine 100.

Cylinder 14 can receive intake air via a series of intake air passages 142, 144, and 146. Intake air passage 146 can communicate with other cylinders of engine 100 in addition to cylinder 14. In some embodiments, one or more of the intake passages may include a boosting device such as a turbocharger or a supercharger. For example, FIG. 1 shows engine 100 configured with a turbocharger including a compressor 152 arranged between intake passages 142 and 144, and an exhaust turbine 154 arranged along exhaust passage 145. Compressor 152 may be at least partially powered by exhaust turbine 154 via a shaft 180 where the boosting device is configured as a turbocharger. However, in other examples, such as where engine 100 is provided with a supercharger, exhaust turbine 154 may be optionally omitted, where compressor 152 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 152 as shown herein, or alternatively may be provided upstream of compressor 152.

Exhaust manifold 148 can receive exhaust gases from other cylinders of engine 100 in addition to cylinder 14. An exhaust passage 145 may be coupled to the exhaust manifold 148. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 145. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 100 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 100, including cylinder 14, may include at least two intake poppet valves and at least two exhaust poppet valves located at an upper region of the cylinder.

Intake valve 150 may be controlled by controller 120 by cam actuation via cam actuation system 151. Similarly, exhaust valve 156 may be controlled by controller 120 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 120 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 100 may include a spark plug 192 for initiating combustion. Ignition system 190 can provide an ignition spark to combustion chamber 14 via spark plug 192 in response to spark advance signal SA from controller 120, under select operating modes. However, in some embodiments, spark plug 192 may be omitted, such as where engine 100 may initiate combustion by auto-ignition or by injection of fuel as may be the case with some diesel engines.

In some embodiments, each cylinder of engine 100 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 120 via electronic driver 168.

In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 120. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 100 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder Controller 120 is shown as a microcomputer, including microprocessor unit 105, input/output ports 107, an electronic storage medium for executable programs and calibration values shown as read only memory chip 110 in this particular example, random access memory 112, keep alive memory 114, and a data bus. Controller 120 may receive various signals from sensors coupled to engine 100, in addition to those signals previously discussed, including measurement of inducted mass air flow (MAF) from mass air flow sensor 111; engine coolant temperature (ECT) from temperature sensor 116 coupled to cooling sleeve 118; a profile ignition pickup signal (PIP) from Hall effect sensor 115 (or other type) coupled to crankshaft 141; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 120 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 105 for performing the methods described below as well as other variants that are anticipated but not specifically listed. Example routines are shown with reference to FIGS. 3-6.

It will be appreciated that while the present example is described with reference to a boosted engine having blow-through capabilities, the adjusting of engine operating parameters such as fuel richness values, blow-through thresholds, temperature thresholds, etc., may be calibrated in other embodiments so that it works optimally for a particular engine, powertrain, and/or vehicle combination.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 100 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 40 converts piston movement into a rotational torque of the rotary shaft. Finally, during the exhaust stroke, the exhaust valve 156 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. The VCT system may be adjusted so that an amount of positive valve overlap during selected boosted engine operating conditions to increase positive valve overlap. Specifically, a position of the intake camshaft may be adjusted such that an opening of the intake valve timing is advanced. Consequently, the intake valve may be opened earlier before the end of the exhaust stroke and a duration over which both valves are open may be increased, leading to more positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings. In other examples, cam lobe switching or variable valve lift may be used instead of variable camshaft timing.

In engine system 100, during periods of rapidly increasing engine load, such as immediately after start-up, upon tip-in, or upon exiting deceleration fuel shut off (DFSO), the amount of intake air compression provided by the compressor may be inadequate. During at least some of these conditions, the amount of boost pressure available from the compressor may be limited due to the turbine not being spun up to a sufficiently high rotational speed (for example, due to low exhaust temperature or pressure). As such, the time required for the turbine to spin up and drive the compressor to provide the required amount of compressed intake air is referred to as turbo lag. During turbo-lag, the amount of torque provided may not match the torque demand, leading to a drop in engine performance.

As such, during a tip-in, when an actual turbine speed is below a desired turbine speed, and when a difference between an intake manifold pressure and an exhaust manifold pressure is less than a threshold difference, the engine may be operated in a secondary air injection mode. Details of engine operation in the secondary air injection mode will be further elaborated at FIG. 4. For example, secondary air may be delivered to the exhaust manifold by utilizing a secondary air pump. An amount of secondary air delivered may be based on the desired turbine speed. Simultaneously, the engine may be operated with rich in-cylinder air-to-fuel ratio. As a result of operating the engine rich, high levels of engine out CO, $H_2$, and hydrocarbons may be generated, which may combine exothermically with the secondary air in the exhaust manifold, thereby increasing exhaust energy. The increased exhaust energy may be utilized to expedite spinning of the turbine to the desired speed, thereby reducing turbo lag. Further, during engine operation with secondary air injection, an intake valve timing and an exhaust valve timing may be adjusted to increase initial torque output. In this way, secondary air injection may be utilized during an early part of tip-in to expedite turbine spin-up and increase an initial torque output until sufficient boost pressure for blow-through is achieved.

Upon achieving sufficient boost for blow-through (that is, when the difference between the intake manifold pressure and the exhaust manifold pressure is greater than a threshold difference), the engine may be operated in a combination mode with secondary air injection and blow-through until a secondary air injection flow rate is below a threshold flow rate. Details of engine operation in the combination mode will be further elaborated at FIG. 6. For example, during engine operation in the combination mode, the secondary air flow rate may be decreased while an amount of blow-through air is increased. Simultaneously, the engine may be operated rich to generate rich exhaust, which may combine exothermically with secondary air and blow-through air in the exhaust manifold to increase the exhaust energy. In one example, the engine operation may not switch from the secondary air injection mode to the combination mode until a threshold boost pressure is achieved. The threshold boost pressure may be at least based on torque demand, for example.

When the secondary air flow rate reaches below the threshold flow rate, secondary air injection may be stopped and the engine may be operated in a blow-through mode. Details of engine operation in the blow-through mode will be further elaborated at FIG. 5. For example, during the blow-through mode, an amount of compressed intake air, herein also referred to as blow-through air, may be directed from the intake manifold to the exhaust manifold, while maintaining stoichiometric catalyst conditions, to provide extra mass flow for spinning up the turbine. In some embodiments, a fuel injection may be adjusted (e.g., enriched) commensurate with the blow-through air amount to provide extra enthalpy for spinning up the turbine. The blow-through air may be provided while the engine has at least some boost, that is, while an intake manifold pressure (MAP) is higher than the exhaust manifold pressure by at least a threshold amount. Based on engine operating conditions prevalent at the time blow-through air is requested, an amount of valve overlap is adjusted so that the required amount of blow-through air can be provided to the turbine via the engine cylinders through positive valve overlap.

For example, to provide the blow-through via the engine cylinders, the VCT system may be adjusted from an initial position having no positive valve overlap to a final position having increased positive valve overlap. In one example, the final position may be position of full valve overlap (or maximum positive valve overlap). While the methods herein discuss providing blow-through air always via positive valve overlap, in alternate embodiments, blow-through air may be provided via positive valve overlap only if the valve timing for providing positive valve overlap does not degrade engine fuel economy, combustion stability, and torque output.

In one example, the engine operation may switch from the secondary air injection mode to the blow-through mode without operating in the combination mode. As an example, a maximum amount of secondary air deliverable by the secondary air pump may be based on an ambient pressure. Therefore, at higher altitudes, where the ambient pressure is lower, the maximum amount of secondary air deliverable by the secondary air pump may decrease. As a result, when an exhaust pressure increases above a threshold pressure, the amount of secondary air delivered may be significantly less than the desired amount. In other words, the exhaust pressure may exceed the secondary air pump capability. Consequently, the engine operation may directly switch to blow-through mode from the secondary air injection mode. However, in some examples, the engine may operate in the combination mode, wherein the difference between the actual secondary air amount and the desired secondary air amount is provided via blow-through.

In another example, the engine operation may switch to blow-through mode when conditions are not favorable for oxidation in the exhaust manifold. For example, when an exhaust temperature is below a threshold temperature, the secondary air pump may be stopped and engine may operate in the blow-through mode.

In some examples, heated secondary air may be provided during engine operation with secondary air injection in order to increase oxidation in the exhaust manifold.

In this way, by coordinating secondary air injection with blow-through air, turbo lag may be reduced and torque output may be improved. Details of coordination of secondary air injection with blow-through air will be further elaborated with respect to FIG. 3

Turning to FIG. 3, it shows an example routine 300 for determining the type of engine operation performed in response to tip-in in order to reduce turbo lag. For example, during early part of tip-in when a turbine speed is below a threshold speed and until a threshold boost pressure is achieved, secondary air may be injected in the exhaust manifold to increase exhaust energy, which may be utilized to spin the turbine. Upon achieving the threshold boost pressure, secondary air injection rate may be reduced and at the same time, blow-through may be utilized. Upon the secondary air injection rate decreasing below a threshold rate, secondary air injection may be stopped and engine operation may switch to a blow-through mode whereby boosted intake air may be directed to the exhaust manifold via positive valve overlap. The method of FIG. 3 may be stored as executable instructions in non-transitory memory of controller 120 shown in FIGS. 1-2.

At 302, the method includes estimating and/or measuring engine operating conditions. These may include, for example, engine speed, load, boost, MAP, intake air flow, ambient conditions such as ambient pressure, temperature, humidity, operator torque demand, exhaust temperature, turbine speed, boost pressure, pedal position, vehicle speed, engine dilution requirement, secondary air pump speed, actual secondary air amount, secondary air flow rate, etc. Next, at 304, a tip-in may be confirmed. For example, it may be determined if the torque demand is increased more than a threshold amount, and/or whether an accelerator pedal is depressed more than a threshold amount. If tip-in is not detected, the routine may end. If the answer at 304 is YES (that is, if tip-in is confirmed), routine 300 may proceed to 306. At 306, the routine may include determining if an actual turbine speed is less than a desired turbine speed. If the answer at 306 is NO, the routine may end. If the answer at 306 is YES, the routine may proceed to 308. That is, if the turbine speed is less than the desired speed, the routine may proceed to 308.

At 308, the routine may include determining if a difference between a manifold absolute pressure at the intake manifold and an exhaust manifold pressure is greater than a threshold difference. That is, it may be determined if a positive pumping regime is established. As such, a positive pumping regime may indicate that engine operating conditions are suitable for a blow-through operation. If the answer at 308 is NO, it may be determined that sufficient boost for the blow-through operation is not available, and subsequently, the routine may proceed to 310. At 310, the routine may include adjusting engine operation to provide secondary air injection. For example, upon determining that sufficient boost for blow-through is not available, the engine may be operated with secondary air injection. During secondary air injection, a secondary air pump may be operated to deliver air in to the exhaust manifold, and simultaneously, the engine may be operated with a rich in-cylinder air-to-fuel ratio so as to generate an exothermic reaction between the exhaust gases from the rich combustion and secondary air delivered by the secondary air pump. As a result, mass and enthalpy of the exhaust gas may be increased, which may be utilized to increase the turbine speed to the desired turbine speed. Further, during engine operation with secondary air injection, the VCT system may be adjusted so as to increase initial torque output. Details of engine operation with secondary air injection will be further elaborated with respect to FIG. 4.

In one example, upon detecting a tip-in event, when the actual turbine speed is less than desired, the engine may be operated with secondary air injection until a threshold turbine speed is reached regardless of the difference between the intake manifold pressure and the exhaust manifold pressure in order to improve initial torque output. Upon reaching the threshold turbine speed, engine operation may switch to operating concurrently with secondary air injection and blow-through, or blow-through alone.

Returning to 308, if the answer at 308 is YES, the routine may proceed to 312. That is, if it is determined that engine operating conditions are suitable for the blow-through operation, the routine may proceed to 312. At 312, the routine may include determining if the secondary air pump is active. If the answer at 312 is yes, the routine may proceed to 314. That is, if it is determined that the secondary air pump is active when sufficient boost is available for blow-through and the turbine speed is less than desired, the routine may proceed to 314. At 314, the routine may include determining if an actual boost pressure is greater than a threshold boost pressure. In this example, the boost pressure may be an intake manifold pressure with respect to the ambient pressure. The threshold boost pressure may be based on the difference between the intake manifold pressure and the exhaust manifold pressure greater than the threshold pressure difference, and further based on one or more of torque demand, engine speed, exhaust temperature, engine temperature, etc. For example, upon determining that sufficient boost is available for blow-through, the engine operation may continue with only secondary air injection until a boost pressure increases above a threshold pressure. Further, as the torque demand increases, the threshold boost pressure may increase.

Accordingly, if the answer at 314 is NO, the routine may proceed to 318. At 318, upon determining that the actual boost pressure is less than the threshold boost pressure, the routine may include continuing engine operation with only secondary air injection.

If the answer at 314 is YES, the routine may proceed to 322. Upon determining that the actual boost pressure is greater than the threshold boost pressure, the engine may be operated in a combination mode, wherein secondary air injection and blow-through may be performed simultaneously, or a blow-through mode, wherein secondary air injection may be stopped and only blow-through may be provided. As such, the type of engine operation that may be performed (when the actual boost pressure is greater than the threshold boost pressure) may be based on an actual secondary air flow rate. Accordingly, at 322, the routine may include determining if a secondary air flow rate is less than a threshold rate.

If at 322, the secondary air flow rate is below the threshold rate, the routine may proceed to 324. At 324, the routine may include deactivating the secondary air pump and providing secondary air only via blow-through. That is, engine operation may switch to the blow-through mode if it is determined that the secondary air flow rate is below the threshold rate. The amount of blow through may be based on the desired turbine speed. For example, as the desired turbine speed increases, the amount of blow-through may increase. Details of engine operation with blow-through will be further elaborated with respect to FIG. 5.

Returning to 322, if the secondary air flow rate is not less than the threshold rate, the routine may proceed to 326. At 326, the routine may include decreasing secondary air flow rate while increasing the amount of blow-through. The amount of blow-through may be based on the desired turbine speed and the actual secondary air flow rate. Details of engine operation with secondary air injection and blow-through will be elaborated at FIG. 6.

Returning to 312, if the secondary air pump is not active, the routine may proceed to 320. At 320, the routine may include operating the engine with blow-through to provide secondary air in the exhaust to reduce turbo lag. The blow-through amount may be based on the desired turbine speed. Details of engine operation in the blow-through mode will be further elaborated with respect to FIG. 5.

In one example, engine operation may switch from the secondary air injection mode to the blow-through mode when a desired secondary air injection amount exceeds the secondary air pump capability. For example, an actual secondary air injection amount may be monitored. If the difference between the desired secondary air injection amount and the actual secondary air injection amount is greater than a threshold difference, it may be determined that the secondary air pump is not delivering the desired secondary air injection amount. For example, the secondary air injection amount delivered by the secondary air pump may be based on an ambient pressure and an exhaust pressure. At high altitudes, when ambient pressure decreases, the amount of secondary air injection delivered by the secondary air pump may decrease. Therefore, the secondary air pump may operate at a higher speed to deliver a desired secondary air injection amount. However, the pump may soon reach a maximum speed, and the secondary air pump may be unable to deliver the desired secondary air injection amount. Therefore, when the difference between the desired secondary air injection amount and the actual secondary air injection amount is above a threshold difference, secondary air pump may be stopped and extra air for oxidation in the exhaust may be delivered via blow-through. For example, as the ambient pressure decreases, blow-through may be provided earlier. That is, with increasing altitude, ambient pressure decreases, and accordingly, blow-through may be provided earlier. In one example, the secondary air pump may be stopped earlier in response to a decrease in ambient pressure below a threshold ambient pressure.

In another example, the secondary air pump may be deactivated based on an exhaust port temperature. For example, if the exhaust port temperature is below a threshold temperature, the exhaust port temperature may be too cold to support sufficient oxidation to generate heat. Therefore, secondary air injection may be stopped, and the engine may be operated with blow-through.

In yet another example, the secondary air pump may be deactivated when an oxidation rate in the exhaust manifold before the turbine is below a threshold rate.

In this way, during tip-in, engine operation may be coordinated to provide secondary air injection prior to providing blow-through in order to reduce turbo lag and improve initial torque output. By providing secondary air injection during an early phase of tip-in, initial torque output may be increased. Further, by utilizing secondary air injection prior to blow-through, sufficient boost may be generated for a subsequent blow-through operation. As a result, engine performance may be improved.

In one example, a method for an engine may comprise during a first condition, delivering a secondary air amount upstream of an exhaust turbine via only a secondary air pump; during a second condition, delivering the secondary air amount via the secondary air pump and delivering a blow-through air amount via a positive valve overlap; and during a third condition, delivering only the blow-through air amount via the positive valve overlap. The first condition may include an actual turbine speed less than a desired turbine speed, a difference between an intake manifold pressure and an exhaust manifold pressure less than a threshold pressure difference. The second condition may include an actual turbine speed less than a desired turbine speed, a difference between the intake manifold pressure and the exhaust manifold pressure greater than the threshold pressure difference, and a boost pressure greater than a threshold boost pressure. The third condition may include an actual turbine speed less than a desired turbine speed, a difference between the intake manifold pressure and the exhaust manifold pressure greater than the threshold pressure difference, the boost pressure greater than the threshold boost pressure, and the secondary air amount less than a threshold amount. The third condition may further include deactivating the secondary air pump to stop secondary air flow. Further a secondary air flow rate may be adjusted based on an amount of oxygen available for oxidation upstream of the turbine. In some examples, the secondary air pump may be deactivated earlier with as an altitude increases.

Turning to FIG. 4, routine 400 depicts a method for adjusting engine operation to deliver secondary air via a secondary air pump into the exhaust manifold upstream of a turbine to reduce a duration required to increase a speed of the turbine to a desired turbine speed during transient conditions, such as a tip-in. Specifically, secondary air pump may be utilized to deliver secondary air during an early part of the tip-in when sufficient boost is not available for a blow-through operation. The method of FIG. 4 may be stored as executable instructions in non-transitory memory of controller 120 shown in FIGS. 1-2.

At 402, routine 400 may include determining and/or measuring engine operating conditions. Engine operating conditions may include an engine temperature, engine speed, an engine load, an ambient temperature, a barometric pressure, an exhaust temperature, a secondary air pump speed, a secondary air amount, an accelerator pedal position, a battery state of charge, etc. Next, at 404 routine 400 may include determining a desired turbine speed. For example, the desired turbine speed may be based on a torque demand, and an acceleration pedal position. Upon determining the desired turbine speed, the routine may proceed to 406. At 406, the routine may include determining a desired secondary air injection flow rate based on the desired turbine speed. For example, as the desired turbine speed increases, the desired secondary air injection flow rate may increase.

Next, at 408 the routine includes adjusting the secondary air pump to deliver a desired secondary air amount. For example, a speed of the secondary air pump may be adjusted so as to deliver the desired secondary air amount. Upon adjusting the secondary air pump, the routine includes, at 410, determining an actual secondary air flow rate. For example, the actual secondary air flow rate may be based on secondary air pump speed, ambient pressure, and exhaust pressure.

Next, at 412, routine 400 includes adjusting engine operation based on the actual secondary air flow rate. For example, adjusting engine operation includes, at 414, adjusting a fuel injection amount based on the actual secondary air flow rate. In one example, the fuel injection amount may increase as the secondary air flow rate increases. Further, fuel injection amount may be adjusted such that overall engine air-to-fuel ratio is stoichiometric. Accordingly, when secondary air injection is utilized, the engine may be operated with a rich in-cylinder air-to-fuel ratio. Further, at 416, adjusting engine operation may include adjusting the VCT system such that volumetric efficiency may be optimized. For example, an intake and/or an exhaust valve timing may be adjusted to reduce positive valve overlap and increase initial torque output. Still further, at 418, adjusting engine operation may include adjusting a spark timing. For example, during engine operation in the secondary air injection mode, the spark timing may be retarded. An amount of spark retard may be based on one or more of a desired torque output, and a desired exhaust energy to turbine. However, an amount of spark retard provided during secondary air injection may be less than the amount of spark retard provided during blow-through. Since less spark retard may be utilized during secondary air injection, combustion may occur close to optimum for immediate torque output. As a result, initial torque output may be increased when secondary air injection is utilized.

In this way, secondary air injection may be utilized early during tip-in in order to increase initial torque output, generate sufficient boost for the blow-through operation, and reduce turbo lag.

Figure 5:
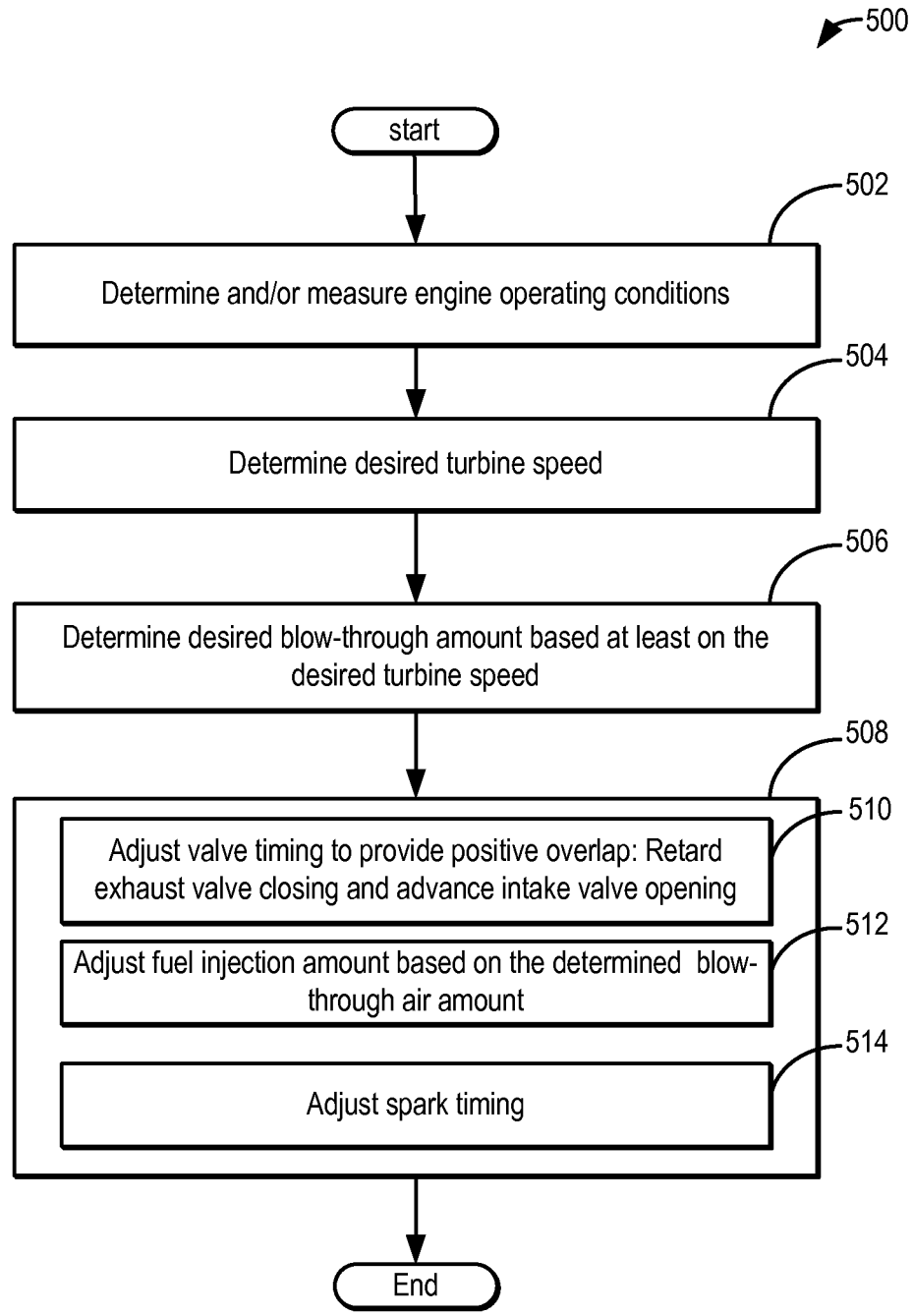
FIG. 5 shows a high level flow chart illustrating a routine that may be implemented for providing blow-through, to be used in conjunction with FIG. 3.

Next, turning to FIG. 5, routine 500 depicts a method for delivering blow-through in order to reduce turbo lag. The method of FIG. 5 may be stored as executable instructions in non-transitory memory of controller 120 shown in FIGS. 1-2. For example, in response to a tip-in, engine 100 may be initially operated with secondary air injection (as discussed at FIG. 4) to generate boost for blow-through, expedite spinning of the turbine to a desired speed, and to increase initial torque output. Subsequently, engine operation may switch to providing only blow-through when a secondary air injection amount decreases below a threshold injection amount. In some examples, in response to tip-in, blow-through may be provided when a difference between the intake manifold pressure and an exhaust manifold pressure increases above a threshold difference. In some other examples, in response to tip-in, blow-through may be provided when a boost pressure is at or above a threshold boost pressure. Prior to reaching the threshold boost pressure, engine may be operated with secondary air injection as discussed at FIG. 4.

As such, during blow-through, engine may be operated with positive overlap such that the boosted blow-through air may be directed into the engine exhaust. Further, engine may be operated with a rich cylinder air-to-fuel ratio. The blow-through air may exothermically react with the engine out exhaust gas (generated by the rich combustion) in the exhaust manifold, thereby increasing mass and enthalpy of the exhaust gas to increase the turbine speed to the desired speed.

At 502, routine 500 may include determining and/or measuring engine operating conditions. The engine operating conditions may include an engine speed, a desired torque output, an exhaust temperature, an exhaust catalyst temperature, a turbine speed, an intake manifold pressure, a boost pressure, a barometric pressure, an exhaust manifold pressure, a pedal position, a vehicle speed, etc. Upon determining the engine operating conditions, the routine may proceed to 504 in order to determine a desired turbine speed. The desired turbine speed may be based on a torque demand, and an accelerator pedal position, for example.

Next, at 504, the routine may include determining a desired blow-through amount based at least on the desired turbine speed. For example, as the desired turbine speed increases the blow-through amount may increase.

Upon determining the desired blow-through amount, at 508, routine 500 may include adjusting engine operation based on the desired blow-through amount. For example, adjusting engine operation may include, at 510, adjusting an intake valve timing and an exhaust valve timing so as to provide positive valve overlap between an intake valve and an exhaust valve. Specifically, the exhaust valve closing may be retarded and the intake valve opening may be advanced in order to provide positive valve overlap for blow-through scavenging. Further, the duration of positive overlap, an intake valve lift amount, and an exhaust valve lift amount may be adjusted to provide the desired blow-through. Further, adjusting engine operation may include, at 512, adjusting a fuel injection amount proportionately with the blow-through amount so as to obtain an overall stoichiometric engine air-to-fuel ratio. The fuel injection amount may be adjusted by adjusting a fuel injector pulse width, for example. Still further, at 514, a spark timing may be adjusted. For example, the spark timing may be retarded as the amount of blow-through increases.

Figure 6:
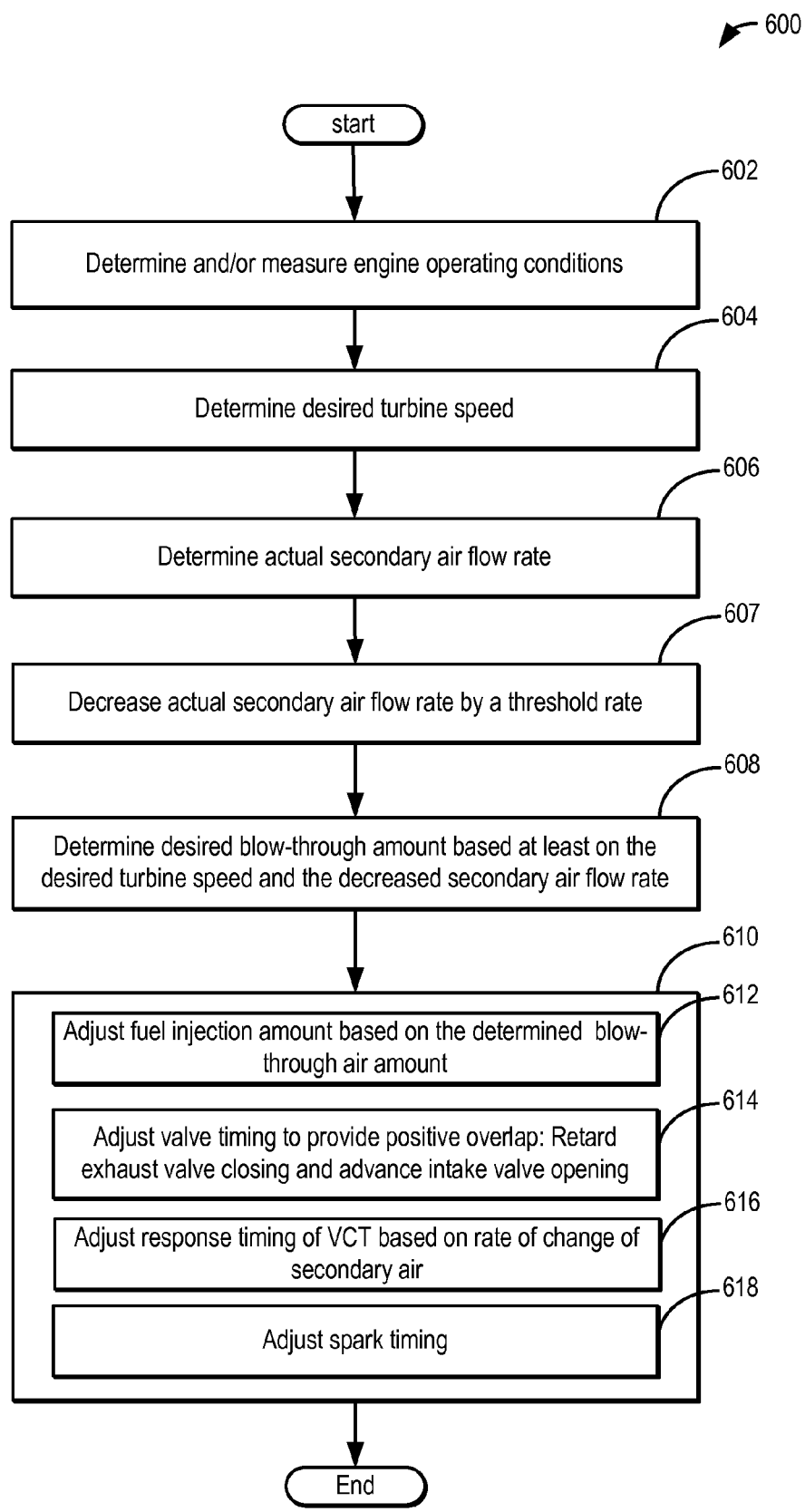
FIG. 6 shows a high level flow chart illustrating a routine that may be implemented for increasing blow-through amount while decreasing secondary air injection amount, to be used in conjunction with FIG. 3.

In this way, blow-through air may be provided during a later part of tip-in after secondary air injection in order to increase the turbine speed to the desired turbine speed Turning to FIG. 6, routine 600 depicts a method for delivering a combination of secondary air and blow-through such that secondary air from a secondary air pump and the boosted air from a blow-through operation are available in the exhaust manifold at the same time to reduce turbo lag. The method of FIG. 6 may be stored as executable instructions in non-transitory memory of controller 120 shown in FIGS. 1-2. For example, during a tip-in, secondary air injection may be performed until an actual boost pressure reaches a threshold boost pressure, after which the engine may operate with secondary air injection and blow-through before switching to operating only with blow-through in order to reduce a duration of time to increase an actual turbine speed to a desired turbine speed. In other words, during an early phase of the tip-in, the engine may be operated with only secondary air injection, during an intermediate phase of the tip-in, the engine may be operated with secondary air injection and blow-through, and during a late phase of tip-in, the engine may be operated with only blow-through.

As such, the intermediate phase of engine operation with secondary air injection and blow-through may be performed to transition engine operation from secondary air injection only to blow-through only. As the intermediate phase progresses, a secondary air injection amount may be decreased, and a blow-through amount may be increased.

At 602, routine 600 may include determining and/or measuring engine operating conditions. Engine operating conditions may include an engine temperature, engine speed, an engine load, an ambient temperature, a barometric pressure, an exhaust temperature, an exhaust catalyst temperature, a secondary air pump speed, a secondary air amount, a battery state of charge, exhaust air/fuel ratio, etc.

Next, at 604 routine 600 may include determining a desired turbine speed. For example, the desired turbine speed may be based on a torque demand, and an acceleration pedal position. Upon determining the desired turbine speed, the routine may proceed to 606. At 606, the routine may include determining an actual secondary air flow rate. As such, prior to operating with blow-through and secondary air injection, the engine may be operated with secondary air injection only.

Next, at 607, the routine may include decreasing the secondary air flow rate by a threshold rate. For example, the secondary air flow rate may be decreased by decreasing a secondary air pump speed. In one example, the threshold rate may be a fixed rate. In another example, the threshold rate may increase with each engine cycle. Upon decreasing the secondary air flow rate, routine 600 may proceed to 608. At 608, the routine may include determining a desired blow-through amount at least based on the desired turbine speed and the decreased secondary air flow rate. For example, as the secondary air injection rate decreases, the blow-through amount may increase.

Next, at 610, routine 600 includes adjusting engine operation to provide blow-through based on the desired blow-through amount. Adjusting engine operation to provide blow-through may include, at 612 adjusting a fuel injection amount based on the desired turbine speed, the decreased secondary air injection amount, and the desired blow-through amount. As such, the engine may be operated rich when secondary air and blow-through is provided in order to provide engine out CO, $H_2$, and hydrocarbons in the exhaust manifold. These compounds from the rich combustion event may exothermically react with secondary air from the secondary air pump and the blow-through air to provide additional exhaust energy to expedite spinning of the turbine to the desired turbine speed.

At 614, the engine operation may include adjusting an intake valve timing and an exhaust valve timing to provide positive overlap. For example, an exhaust valve closing timing may be retarded and an intake valve opening timing may be advanced to generate positive valve overlap. Further, the duration of positive overlap, an intake valve lift amount, and an exhaust valve lift amount may be adjusted to provide the desired blow-through.

At 616, the engine operation may include adjusting a response timing of the VCT based on the rate of change of secondary air injection. Further, at 618, a spark timing may be adjusted. For example, the spark timing may be retarded, and the amount of spark retard may increase as the desired air amount for oxidation in the exhaust increases.

In this way, during tip-in, the engine may be operated in a combination mode including secondary air injection and blow-through after operating in secondary air mode, and prior to operating in blow-through mode to reduce turbo lag.

Figure 7:
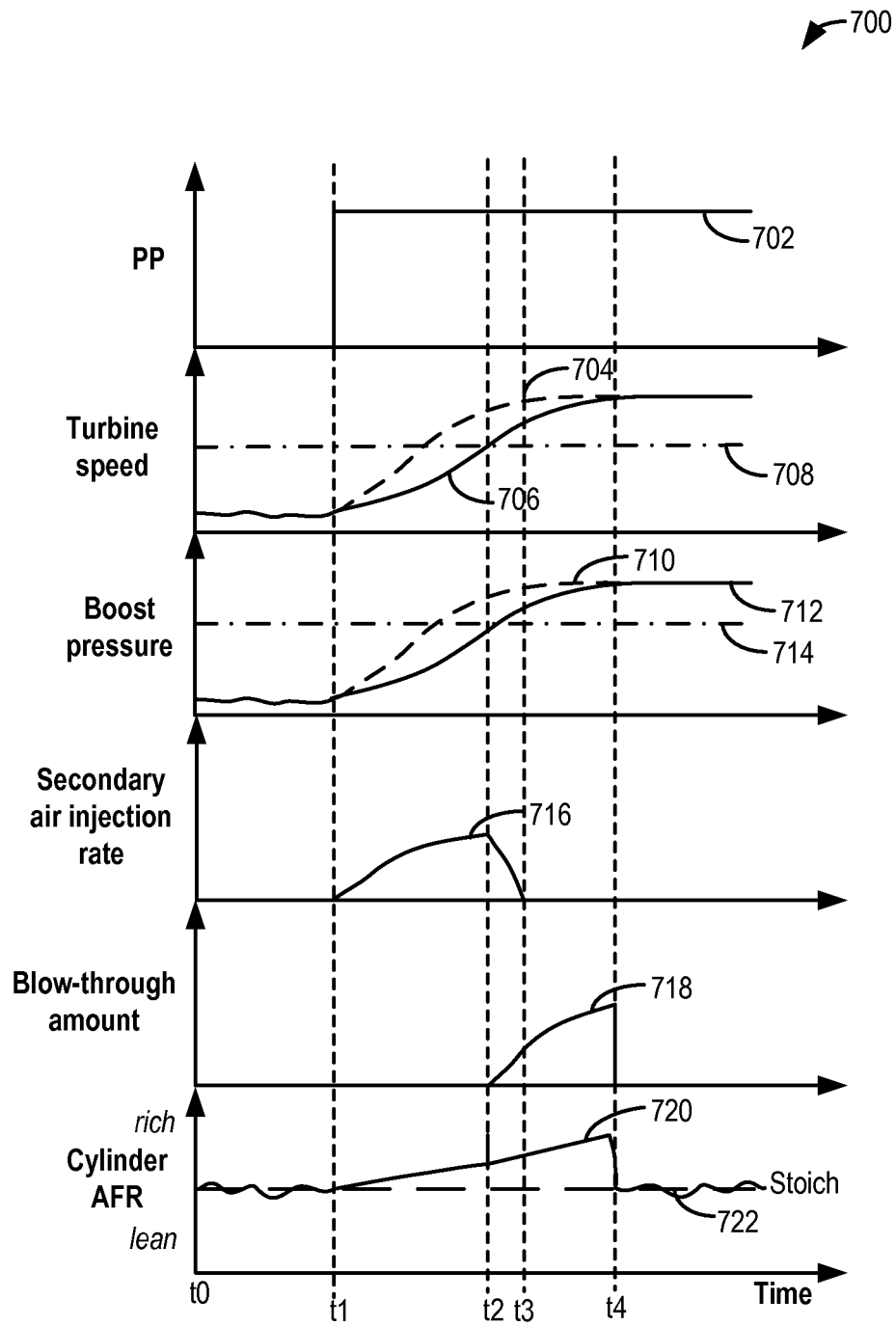
FIG. 7 shows example secondary air and blow-through adjustments to reduce turbo lag, according to the present disclosure.

Turning to FIG. 7, example adjustments of secondary air injection and blow-through during a tip-in operation are shown. The sequence of FIG. 7 may be provided by executing instructions in the system of FIG. 1 according to the method of FIGS. 3-6. Vertical markers at times t0-t3 represent times of interest during the sequence. In all the plots discussed below, the X axis represents time and time increases from the left side of each plot to the right side of each plot.

The first plot from the top of FIG. 7 represents accelerator pedal position (PP) versus time. The Y axis represents accelerator pedal position and a depression of the accelerator pedal increases in the direction of the Y axis arrow.

The second plot from the top of FIG. 7 represents turbine speed versus time. The Y axis represents a turbine speed and the turbine speed increases in the direction of the Y axis arrow. Trace 704 represents a desired turbine speed, trace 706 represents an actual turbine speed, and horizontal line 708 represents a threshold turbine speed. As such, the threshold speed may be a turbine speed at which sufficient boost pressure may be generated for blow-through.

The third plot from the top of FIG. 7 represents boost pressure versus time. The Y axis represents a boost pressure and the boost pressure increases in the direction of the Y axis arrow. Trace 710 represents a desired boost pressure, trace 712 represents an actual boost pressure and horizontal line 714 represents a threshold boost pressure. As such, at the threshold boost pressure, a difference between an intake manifold pressure and an exhaust manifold pressure may reach a pressure equal to or greater than a threshold pressure difference required for generating boost pressure for providing blow-through.

The fourth plot from the top of FIG. 7 represents secondary air injection amount versus time. The Y axis represents a secondary air injection amount and the secondary air injection amount increases in the direction of the Y axis arrow.

The fifth plot from the top of FIG. 7 represents blow-through amount versus time. The Y axis represents a blow-through amount and the blow-through amount increases in the direction of the Y axis arrow.

The sixth plot from the top of FIG. 7 represents in-cylinder air-to-fuel ratio versus time. The Y axis represents an in-cylinder air-to-fuel ratio and a richness of the in-cylinder air-to-fuel ratio increases in the direction of Y axis arrow. The X axis represents time and time increases from the left side of the plot to the right side of the plot. Horizontal line 722 represents a stoichiometric air-to-fuel ratio.

As such, the desired turbine speed may be based on one or more of a torque demand, and an accelerator pedal position, the desired boost pressure may be based on one or more of a torque demand, and an accelerator pedal position, the secondary air injection amount may be based on the desired turbine speed, and the blow-through amount may be based on the desired turbine speed when only blow-through is provided and based on the desired turbine speed and the actual secondary air flow rate when blow-through and secondary air injection are provided.

At time prior to t1, the engine may be operating at low engine speed and low load conditions. The difference between the desired turbine speed and the actual turbine speed may not be greater than a threshold speed. Likewise, the difference between the desired boost and the actual boost pressure may not be greater than a threshold pressure. In one example, the actual turbine speed may reach the desired turbine speed and the actual boost may reach the desired boost. Therefore, additional secondary air may not be required to increase the speed of the turbine to achieve a desired boost. That is, the engine may be operated in a normal mode without blow-through and without secondary air injection. Further, the engine may be operating with a stoichiometric air-to-fuel ratio.

At time t1, a tip-in may be detected. For example, the tip-in may be detected based on one or more of an increase in torque demand greater than a threshold demand, and an increase in accelerator pedal position (depression) greater than a threshold amount. Between times t1 and t2, in response to detecting the tip-in, the desired boost pressure may increase (710). In order to provide the desired boost, the desired turbine speed may increase (704). However, the actual turbine speed (706) may be less than the desired turbine speed (704). As a result, the actual boost (712) may be less than the desired boost (710). Further, the difference between the desired turbine speed and the actual turbine speed may be greater than a threshold speed difference, and the difference between the desired boost pressure and the actual boost pressure may be greater than a threshold boost pressure difference. That is, the engine may experience a turbo lag.

In order to reduce turbo lag, at t1, the engine may be operated in a secondary air injection mode. That is, in order to reduce a duration of time to increase the actual turbine speed to the desired speed, and hence, reduce a duration of time to increase the actual boost to the desired boost, the engine may be operated in the secondary air injection mode. As such, during the initial phase of tip-in, a difference between an intake manifold pressure and a exhaust manifold pressure may not be greater than a threshold manifold pressure difference (not shown). As a result, sufficient pressure difference may not be available to provide blow-through air in the exhaust manifold. Therefore, a secondary air pump (e.g., air pump 96 at FIG. 1) may be utilized to inject secondary air into the exhaust manifold upstream of the turbine. Details of engine operation with secondary air injection are elaborated at FIG. 4. An amount of secondary air injected (716) in to the exhaust manifold may be based on the desired turbine speed. For example, as the desired turbine speed increases, the secondary air injection amount may increase. In one example, the secondary air injection amount may be based on the desired exhaust energy required to increase the turbine speed to the desired speed.

Further, between times t1 and t2, the engine may be operated with rich in-cylinder air-to-fuel ratio. The degree of richness may be based on the secondary air injection amount. In one example, the fuel injection amount may be based on the secondary air injection amount. As such, when the cylinder is operated with rich air-to-fuel ratio, high levels of engine-out carbon monoxide (CO), hydrogen ($H_2$), and hydrocarbons may be generated, which may react exothermically with the secondary air injected into the exhaust manifold. As a result mass and enthalpy of the exhaust gases may be increased. The increased exhaust energy may be utilized to reduce the duration of time for the turbine to reach the desired speed. In other words, by utilizing secondary air injection and in-cylinder enrichment during an initial phase of tip-in, turbo lag may be reduced. Further, by providing secondary air trapped mass of compressed intake air in the cylinder may increase resulting in increased initial torque output with respect to normal engine operation when secondary air injection is not utilized. Still further, valve timing may be adjusted for increased volumetric efficiency in order to increase initial torque output during tip-in.

At time t2, the actual turbine speed (706) may reach a threshold speed (708), and the actual boost pressure may reach a threshold pressure. However, the actual turbine speed may continue to be below the desired turbine speed, and the boost pressure may continue to be below the desired boost pressure. Further, at t2, the difference between the intake manifold pressure and the exhaust manifold pressure may be at a threshold pressure difference at which sufficient boost may be available for providing blow-through. Accordingly, engine operation may switch from providing only secondary air via the secondary air pump to a utilizing a combination of secondary air injection and blow-through. In one example, during tip-in, when the actual boost pressure reaches the threshold boost pressure, engine operation may switch from utilizing secondary air pump for secondary air to providing blow-through via positive valve overlap. In another example, during tip-in, as shown in the example illustrated herein, when the actual boost pressure reaches the threshold boost pressure, engine operation may switch from utilizing secondary air pump for secondary air to utilizing both secondary air and blow-through. However, in some examples, the threshold pressure difference required for blow-through may be attained earlier than the threshold boost pressure. Accordingly, in one example, upon reaching the threshold pressure difference required for blow-through, engine may continue utilizing only the secondary air pump for secondary air until the threshold boost pressure is reached at which the engine operation may either switch to a combination of utilizing secondary air pump and blow-through or switch to a blow-through only mode.

Between times t2 and t3, the turbine speed may increase above the threshold speed, and the boost pressure may increase above the threshold pressure. As such, sufficient boost may be available for blow-through. Accordingly, engine may be operated with secondary air injection and blow-through. For example, secondary air injection amount may be decreased and blow-through may be increased for a duration of time until the secondary air injection amount reaches below a threshold amount. As such, secondary air may be delivered to the exhaust manifold upstream of the turbine by the secondary air pump. Blow-through may be provided by adjusting a valve timing such that the intake and the exhaust valves have a duration of positive overlap. Details of the engine operation in the combination mode during which secondary air injection and blow-through are provided simultaneously is elaborated at FIG. 6. Further, the engine may be operated with rich in-cylinder air-to-fuel ratio. The fuel injection amount may be based on the secondary air injection amount, a blow-through amount, and the desired turbine speed. In one example, the fuel injection amount may be based on the secondary air injection amount, the blow-through amount, the desired turbine speed, and/or the desired torque demand.

At time t3, the secondary air injection amount may decrease below a threshold injection amount. As a result, engine operation may switch from utilizing both secondary air injection and blow-through to utilizing only blow-through until the desired turbine speed is reached.

At times between t3 and t4, engine operation may continue with blow-through only. As such, during blow-through, positive overlap between the intake and the exhaust valves may be provided to deliver boosted air from the intake directly into the exhaust manifold. Further, the cylinder may be operated with rich in-cylinder air-to-fuel ratio. The un-combusted fuel in the exhaust may combine exothermically with the blow-through air. Consequently, mass and enthalpy of the exhaust gas may be increased. As a result, spinning of the turbine to the desired speed may be expedited, and turbo lag may be reduced.

At time t4, the actual turbine speed may reach the desired turbine speed, and the boost pressure may reach the desired boost pressure. As a result, the desired torque demand may be met. Upon attaining the desired turbine speed and/or torque demand, blow-through may be stopped. That is, upon attaining the engine operation may switch from providing blow-through to normal engine operation without secondary air injection and/or blow-through. For example, engine operation in the normal mode may include providing no positive overlap or minimal positive overlap such that no blow-through air is provided (or blow-through may be negligible) and not operating the secondary air pump. Further, during engine operation in the normal mode, the in-cylinder air-to fuel ratio may be maintained at stoichiometry.

In this way, in response to a tip-in, the engine may be operated with only secondary air injection during an early part of tip-in, with secondary air injection and blow-through during an intermediate part of tip-in, and with only blow-through during a later part of tip-in in order to improve initial torque output, and reduce turbo lag.

In one example, a method may comprise: supplying compressed air through a throttle to an engine from a compressor driven by a turbine coupled to an exhaust of the engine; and during tip-in of the throttle, reducing turbo-lag by delivering ambient air to the turbine during a first mode of operation and during a second mode of operation providing blow-through of a portion of the compressed air through the engine, without combustion, to the turbine. Further, during the tip-in, the engine may be operated in a third mode of operation which concurrently includes the delivering ambient air to the turbine and the providing blow-through of a portion of the compressed air through the engine, without combustion, to the turbine. The first mode of operation occurs when a pressure difference between air pressure downstream of the throttle and pressure of the exhaust is less than a first threshold. The second mode of operation occurs when a pressure difference between air pressure downstream of the throttle and pressure of the exhaust exceeds a second threshold. Further, the ambient air is provided from an air pump coupled to the exhaust upstream of said turbine, and the blow-through is provided during an exhaust stroke of a combustion chamber of the engine by opening an intake valve coupled to the combustion chamber before closing an exhaust valve coupled to the combustion chamber. Still further, the first mode of operation continues until boost pressure from the compressor reaches a preselected amount, and may include adjusting a fuel injection amount based on an amount of ambient air delivered, wherein the amount of ambient air delivered is based on a desired turbine speed. During the second mode, adjusting the fuel injection amount may be based on an amount of blow-through provided, and during the third mode, adjusting the fuel injection amount may be based on the amount of ambient air and the amount of blow-through.

Still further, the first mode may include adjusting a first spark timing, the second mode may include adjusting a second spark timing, and the third mode may include adjusting a third spark timing, wherein the first spark timing is less retarded than the third spark timing, and the third spark timing is less retarded than the second spark timing. By providing the first spark timing less than the third spark timing less than the second spark timing, spark timings may be adjusted for increased initial torque output while increasing exhaust energy for reducing turbo lag.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   supplying compressed air through a throttle to an engine from a compressor driven by a turbine coupled to an exhaust of the engine; and
   during tip-in of the throttle, reducing turbo-lag by delivering ambient air to the turbine during a first mode of operation and during a second mode of operation providing blow-through of a portion of the compressed air through the engine, without combustion, to the turbine.

2. The method of claim 1, further comprising, a third mode of operation which concurrently includes the delivering ambient air to the turbine and the providing blow-through of a portion of the compressed air through the engine, without combustion, to the turbine.

3. The method of claim 1, wherein the first mode of operation occurs when a pressure difference between air pressure downstream of the throttle and pressure of the exhaust is less than a first threshold.

4. The method of claim 1, wherein the second mode of operation occurs when a pressure difference between air pressure downstream of the throttle and pressure of the exhaust exceeds a second threshold.

5. The method of claim 1, wherein the ambient air is provided from an air pump coupled to the exhaust upstream of said turbine.

6. The method of claim 1, wherein the blow-through is provided during valve overlap of a combustion chamber of the engine by opening an intake valve coupled to the combustion chamber before closing an exhaust valve coupled to the combustion chamber.

7. The method of claim 1, wherein the first mode of operation continues until boost pressure from the compressor reaches a preselected amount.

8. The method of claim 1, further comprising, during the first mode, adjusting a fuel injection amount based on an amount of ambient air delivered, during the second mode, adjusting the fuel injection amount based on an amount of blow-through provided, and during the third mode, adjusting the fuel injection amount based on the amount of ambient air and the amount of blow-through.

9. The method of claim 8, wherein the amount of ambient air delivered is based on a desired turbine speed.

10. The method of claim 9, further comprising, during the first mode adjusting a first spark timing, during the second mode adjusting a second spark timing, and during the third mode adjusting a third spark timing, wherein the first spark timing is less retarded than the third spark timing, and the third spark timing is less retarded than the second spark timing.

11. A method for an engine, comprising:
during a first condition, delivering a secondary air amount upstream of a turbine coupled to an exhaust of the engine via only a secondary air pump;
during a second condition, delivering the secondary air amount via the secondary air pump and delivering a blow-through air amount via a positive valve overlap of an intake valve and an exhaust valve of the engine; and
during a third condition, delivering only the blow-through air amount via the positive valve overlap.

12. The method of claim 11, wherein the first condition comprises one or more of the following: an actual turbine speed less than a desired turbine speed, a difference between pressure in an intake manifold of the engine and pressure in an exhaust manifold of the engine less than a threshold pressure difference.

13. The method of claim 12, wherein the second condition comprises one or more of the following: an actual turbine speed less than a desired turbine speed, a difference between the intake manifold pressure and the exhaust manifold pressure greater than the threshold pressure difference, and a boost pressure greater than a threshold boost pressure.

14. The method of claim 13, wherein the third condition comprises one or more of the following: an actual turbine speed less than a desired turbine speed, a difference between the intake manifold pressure and the exhaust manifold pressure greater than the threshold pressure difference, the boost pressure greater than the threshold boost pressure, and the secondary air amount less than a threshold amount.

15. The method of claim 14, further comprising adjusting a secondary air flow rate based on an amount of oxygen available for oxidation upstream of the turbine, and wherein the boost pressure is an intake manifold pressure.

16. The method of claim 15, further comprising during the third condition, deactivating the secondary air pump to stop secondary air flow.

17. The method of claim 16, further comprising deactivating the secondary air pump earlier with increasing altitude.

18. A method for an engine, comprising:
during tip-in of a throttle coupled to an intake manifold of the engine,
when a boost pressure from a compressor coupled to the intake manifold is less than a threshold boost pressure, operating the engine in a secondary air injection mode to provide a desired secondary air flow rate to a turbine coupled to an exhaust of the engine, the turbine driving the compressor; and
when the boost pressure is greater than the threshold boost pressure, operating the engine in a combination mode to provide blow-through of a portion of compressed air from the compressor to the turbine in addition to operating the engine in the secondary air injection mode;
wherein during the secondary air injection mode, the desired secondary air flow rate is based on a desired turbine speed; and
wherein during the combination mode, the secondary air flow rate is decreased and a blow-through amount is increased.

19. The method of claim 18, further comprising when the secondary air flow rate is below a threshold flow rate, deactivating the secondary air injection mode and operating the engine in the blow-through mode, wherein deactivating the secondary air injection mode includes stopping a secondary air pump.

20. The method of claim 18, further comprising, in response to a difference between the desired secondary air flow rate and an actual secondary air flow rate increasing above a threshold flow rate difference, and in response to the secondary air injection flow rate below a threshold flow rate, stopping secondary air injection and providing boosted air in the exhaust manifold via blow-through.

* * * * *